US007588832B2

(12) United States Patent
Schiegl et al.

(10) Patent No.: US 7,588,832 B2

(45) Date of Patent: Sep. 15, 2009

(54) PROCESS AND DEVICE FOR WETTING WOOD FIBERS WITH A BINDING FLUID

(75) Inventors: Walter Schiegl, St. Johann in Tirol (AT); Holger Reinecke, Dortmund (DE); Michael Himmelreich, Paderborn (DE); Hans-Dieter Kehrmann, Sprockoevel (DE)

(73) Assignee: Fritz Egger GmbH & Co., Unterradlberg (AT)

(*) Notice: Subject to any disclaimer, the term of this patent is extended or adjusted under 35 U.S.C. 154(b) by 598 days.

(21) Appl. No.: 10/494,535

(22) PCT Filed: Nov. 4, 2002

(86) PCT No.: PCT/EP02/12286

§ 371 (c)(1),
(2), (4) Date: Nov. 12, 2004

(87) PCT Pub. No.: WO03/037582

PCT Pub. Date: May 8, 2003

(65) Prior Publication Data

US 2005/0064169 A1 Mar. 24, 2005

(30) Foreign Application Priority Data

Nov. 2, 2001 (DE) ................................ 101 53 593

(51) Int. Cl.
*B32B 29/00* (2006.01)

(52) U.S. Cl. ................... 428/536; 428/537.1; 428/34.2; 428/292.4; 264/109; 156/346

(58) Field of Classification Search ................. 428/536, 428/537.1, 34.2, 292.4; 136/202; 156/346; 264/109
See application file for complete search history.

(56) References Cited

U.S. PATENT DOCUMENTS

| | | | | | |
|---|---|---|---|---|---|
| 4,285,843 | A | * | 8/1981 | Mayerhoffer | 524/13 |
| 5,057,160 | A | * | 10/1991 | Ward et al. | 136/202 |
| 5,057,166 | A | | 10/1991 | Young, Sr. et al. | |

FOREIGN PATENT DOCUMENTS

| | | | | |
|---|---|---|---|---|
| DE | 197 40 676 | | | 3/1999 |
| EP | 530 501 | | | 10/1993 |
| EP | 0745463 | A2 | * | 4/1996 |
| EP | 0745463 | | | 12/1996 |
| EP | 1 022 103 | | | 7/2000 |
| WO | WO 0243934 | | | 6/2002 |

* cited by examiner

*Primary Examiner*—Leszek Kiliman
(74) *Attorney, Agent, or Firm*—Proskauer Rose LLP

(57) ABSTRACT

The technical problem of the invention is to improve the wetting of wood fibers with a binding agent. This technical problem is solved according to the present invention by a device for wetting wood fibers (10, 109) with a binding fluid, with a transport pipe (16, 105) for transporting the wood fibers (10, 109), with a fan (14, 106) for generating a transport air current, with a guide tube (17, 109) connected to the transport pipe (16, 105), with a fan (20, 110) for generating a conveying air current in the guide tube (17, 109), with means (27, 12) for supplying the binding fluid in the guide tube (17, 109). The invention also relates to a process for wetting wood fibers with a binding fluid.

21 Claims, 4 Drawing Sheets a)

b)

PROCESS AND DEVICE FOR WETTING WOOD FIBERS WITH A BINDING FLUID

BACKGROUND OF THE INVENTION

The invention relates to a process and a device for wetting wood fibres with a binding fluid, in particular for dry sizing of wood fibres. The invention also relates to a process for manufacturing a fibre board as well as the fibre board itself.

In general terms, the invention relates to applying a fluid to solid particles in a conveying air stream.

The manufacture of fibre boards such as e.g. medium-density fibre board (MDF), high-density fibre board (HDF) and fibre boards of low density (LDF) according to the dry method is known. Lumpy wood is pulped in the pulper by the effect of pressure and temperature in a saturated steam atmosphere. The lumpy wood thus softened reaches the refiner, in which it is mechanically pulped into fine wood fibres.

A pipe, the so-called blowline, guides the mixture of steam, water and fibres from the refiner to the dryer. In the blowline the fibres travel at a very high speed in the vicinity of 30 to 100 m/sec. The sudden drop in pressure when the water vapour-water-fibre mixture exits from the blowline and enters the dryer supports singling out the fibres. Fibre agglomerates can be shredded, so that subsequent drying in the bus tube dryer brings the fibres effectively in a few seconds to fibre humidity by ca. 10%, relative to the dry mass.

Cyclones separate the dried fibres from the air flow and via conveyor equipment these are fed to a sifter for separating out glue lumps, fibre agglomerates or other entrained lumps, which detach from the inner wall of the bus tube dryer and/or from the lines. The dried fibre material thus treated reaches the former, where a fibre cake of minimal thickness (20 to 30 kg/m$^3$) is formed. Under the effect of pressure and temperature a board is formed in a press, which may have a thickness of 2 to 50 mm and a density between 60 to 1000 kg/m$^3$.

The above described manufacturing technology known from the prior art provides for supplying the binding agent to the mixture of water and wood fibres in the blowline, and also on the path of the fibres between refiner output and dryer input. The binding agent is thus subjected to a high temperature of well over 100° C. for a certain period from being fed to the fibres. This is significant insofar as the binding agent is to be cured in the press by the action of temperature. Usual binding agents are condensation resins such as aminoplasts (urea formaldehyde resin (UF), melamine formaldehyde resin (MUF) or mixtures thereof) and/or isocyanates (e.g. PMDI). The reaction capacity of the resins must match the increased temperature requirements during gluing and drying insofar as the latter react very sluggishly. This is reflected in the curing rate. If the press factor (dwell time of the board in seconds per millimetre of board thickness in the press) is compared, then that of a MDF board is in the region by 8 to 12 s/mm of that of a particle board of comparable density and same thickness by 4 s/mm. Therefore a board press of the same size for particle board has a performance higher by ca. 50% than that for MDF. In addition, the high press factor for MDF is also influenced by other parameters such as e.g. heat penetration, steam transport from the exterior to the board centre, steaming out on the press end. The essential influence is however the sluggish reactivity of the binding agent.

Acceleration testing with e.g. hardeners or another production method for resins have so far not shown any success, since the associated advanced curing in the dryer has not brought about any improvement of mechanical board properties or any reduction in the press factor and/or any reduction in the required quantity of adhesive.

Also, the binding agent in the blowline is subjected to water, so that the binding agents are also curtailed in this respect. Different binding agents, which are suitable per se for producing fibre boards, cannot be used for contact with water, or can be used but only limited. This applies in particular for isocyanates. So-called encapsulated isocyanates are in use, and are suited principally for a blowline adhesion, yet trouble-free operation over several days is not possible. As a rule the blowline accrues through isocyanate reacting with water and the plant must be shut down for cleaning.

The water present in the blowline has a minimal pH value, which results from the previous cooking of the wood chips. Aminoplasts such as urea formaldehyde resins (UF) and melamine formaldehyde resins (MF) are acid hardening, which is why advanced hardening already takes place in the blowline.

The technical problem of the present invention is now to improve the wetting of wood fibres with a binding agent.

SUMMARY OF THE INVENTION

This technical problem is solved by a device as claimed in claim 1 as well as by a process as claimed in claim 18. Herein below the invention is explained first in greater detail by means of the individual procedural steps, before the inventive device is described by means of embodiments.

Beyond the process and device directed at the wetting of wood fibres and described herein below the invention also generally comprises applying or wetting solid particles with a fluid, independently of whether the particles are wood fibres and the fluid is a binding fluid. The description of the wetting of wood fibres with a binding fluid is made as a preferable exemplary application.

The process for wetting wood fibres with a binding fluid as claimed in claim 1 consists of the following steps.

The wood fibres are guided along a transport tube with a transport air current to a guide tube, in which a conveying air stream is generated. The binding fluid is fed from outside and distributed in the guide tube inside the conveying air stream, preferably resulting in a mist of binding agent. The wood fibres are then conveyed in the conveying air stream along with the distributed binding fluid and brought into contact therewith, so that the wood fibres are wet at least partially with the binding fluid.

Since the conveying air stream serves exclusively to convey the wood fibres, the parameters of temperature, pressure and moisture of the conveying air stream can be adjusted for optimal wetting of the wood fibres, in particular adapted to the properties of the binding fluid. The advantage of this is that the quantity of the binding fluid added to the wood fibres can be adjusted very precisely and more effectively. This can be done in particular with respect to the properties of the binding fluid, such that the proportion of the binding agent by weight of wood fibres can be reduced compared to previous processes.

Preferably the wood fibres are conveyed upwards substantially vertically in the guide tube, by which deposits are reduced or prevented on side walls of the guide tube.

By way of example an additive in the form of a fluid or in the form of a solid dispersed in a fluid can be added in to the conveying air stream. The wood fibres can thus be at least partially wet with the additive in addition to the binding fluid. In this way additives such as dyes, hardeners or means for better fire resistance can be added simply.

The above mentioned method can be applied as follows to a process for producing a fibre board. The fibre board is in particular a medium-density fibre board (MDF), a high-density fibre board (HDF) or a fibre board with low density (LDF), which at least comprise a proportion of wood fibres and a proportion of binding agent.

First, wood is pulped conventionally in a pulper under the effect of temperature and pressure. The pulped wood is mechanically shredded and the resulting mixture of water, water vapour and wood fibres is sent to a dryer by means of a blowline. The wood fibres are separated and dried in the dryer at least partially.

The resulting shredded and dried wood fibres are then wet with a binding fluid (dry adhesion) at least partially by means of the above described process in the dry state.

Next the wood fibres at least partially wet with binding fluid are sent to a former for producing a form cake and a fibre board is made out of the form cake by press.

Using the inventive process for wetting wood fibres with a binding fluid in a separate procedural step following shredding and drying the wood fibres offers the possibility of wetting the wood fibres with the binding agent or also with other additives. This effectively improves the properties of the fibre board to be made.

The process in principal has no particular requirements for other manufacturing processes before or after. So it can be utilised for each type of applying a fluid to a fibre or to fine transportable material, by means of an air flow. Previous drying of the material is just as little required as further processing, e.g. forming of boards following application of the fluid. The process is accordingly suitable for applying e.g. binding agents to mineral fibres (rock wool damping products), to fibre glass (fibre glass damping products) or to any kind of natural fibres (coconut, jute, hemp, sisal) for making insulating materials, fibre items or similar, or also to any kind of synthetic fibres. In the same way fine material such as e.g. wood dust, dust from mineral material (sands, quartz sand, marble dust, corundum) or similar can be wet with fluid.

The process is suitable also both as a standalone device for applying a fluid to a material transportable by means of an air flow, and for integration of this process in a production process.

The invention also relates to a fibre board, in particular medium-density fibre board (MDF), high-density fibre board (HDF) or fibre board with low density (LDF) comprising at least a portion of wood fibres and a portion of binding agent. The fibre board is characterised in that the portion of binding agent is less than 12% by weight relative to the dry mass of the fibre portion. The portion of binding agent is preferably less than 10% by weight relative to the dry mass of the fibre portion. In particular the portion of binding agent is less than 8% by weight relative to the dry mass of the fibre portion.

Therefore a fibre board can be made with a lesser portion of binding agent than previously, offering improved environmental-related properties, quite apart from cost economising during manufacture.

The binding agent can preferably be a urea formaldehyde resin (UF), melamine urea formaldehyde resin (MUF) or an isocyanate (PMDI). However, other binding agents, suitable for making a fibre board, can also be employed.

BRIEF DESCRIPTION OF THE DRAWINGS

The inventive device will now be explained in greater detail herein below by means of embodiments, with reference to the attached diagrams, in which.

DETAILED DESCRIPTION OF THE INVENTION

Figure 1:
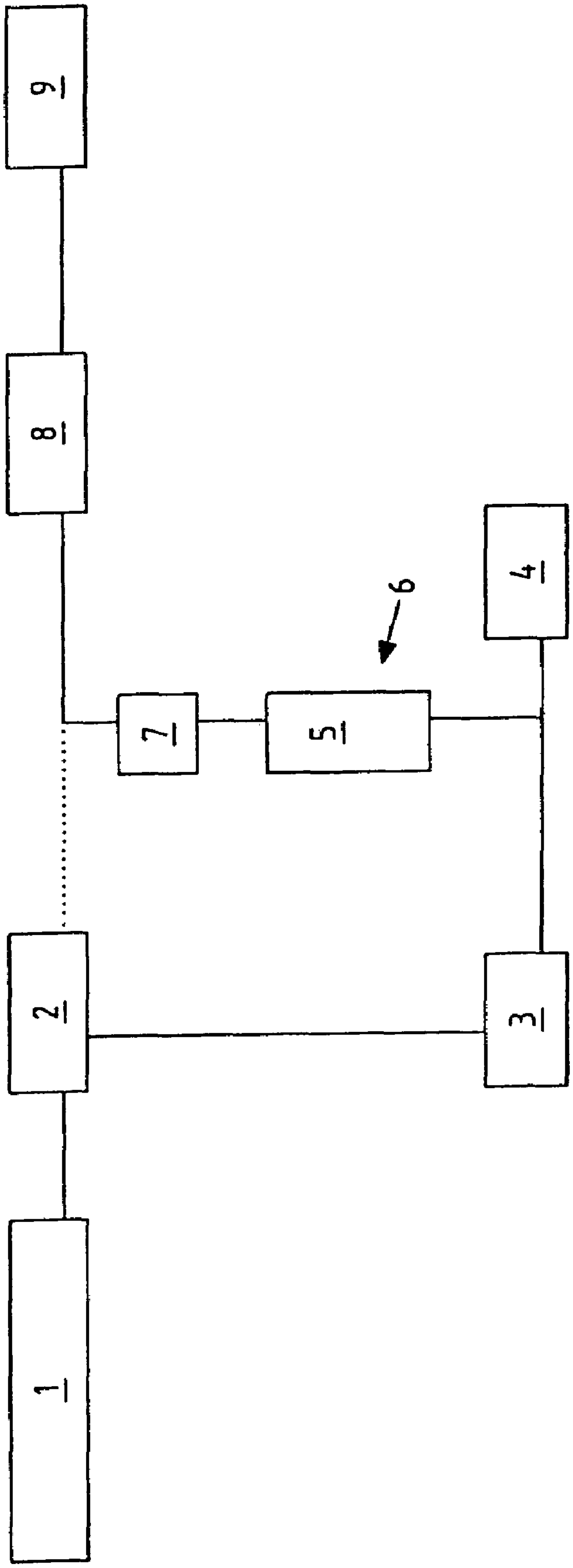
FIG. 1 is a schematic diagram of an inventive process sequence for manufacturing a fibre board.

FIG. 1 shows a principal drawing, such as e.g. the device for wetting the wood fibres, which can be integrated into an existing manufacturing process for producing fibre boards after the drying procedure. The fibres are dried in the bus tube dryer 1 in a known manner to a moisture required for the manufacturing process of for example 10% relative to the dry mass. Prior to drying a part of the binding agent and of the additives can already be applied to the fibres in the usual manner in the blowline. Additives are understood to include wax and paraffin for swelling tempering, means for improved resistance against biological pests, dyes for individual colour shaping of the finished board or other liquid, solid and pasty constituents.

Applying binding agents and additives in known fashion can also be completely dispensed with and the entire quantity of binding agent and additives is applied to the fibres according to the inventive process. The necessary moisture, which the fibres should have following the dryer 1, can deviate considerably from the usual moisture (ca. 5 to 15%). While the wood fibres are being treated by the inventive process it is possible to match the fibre moisture ideally to the subsequent process of board manufacture.

After the dryer 1 the fibres reach the fibre cyclone 2 for separating the drying air. A fibre fan 3 here takes over the fibres and forwards them to a generally vertically arranged ascending pipe 5, in which transport air is introduced in addition by a fan 4. The fibres are wet with binding agent and other components such as e.g. additives in the ascending pipe 5 by means of a plurality of nozzles in a misting zone 6. The wet fibres then reach a cyclone 7 and a coarse material separator 8 (sifter) and are then sent for the usual further processing 9 such as forming of the fibre cake and pressing to form the boards.

Figure 2:
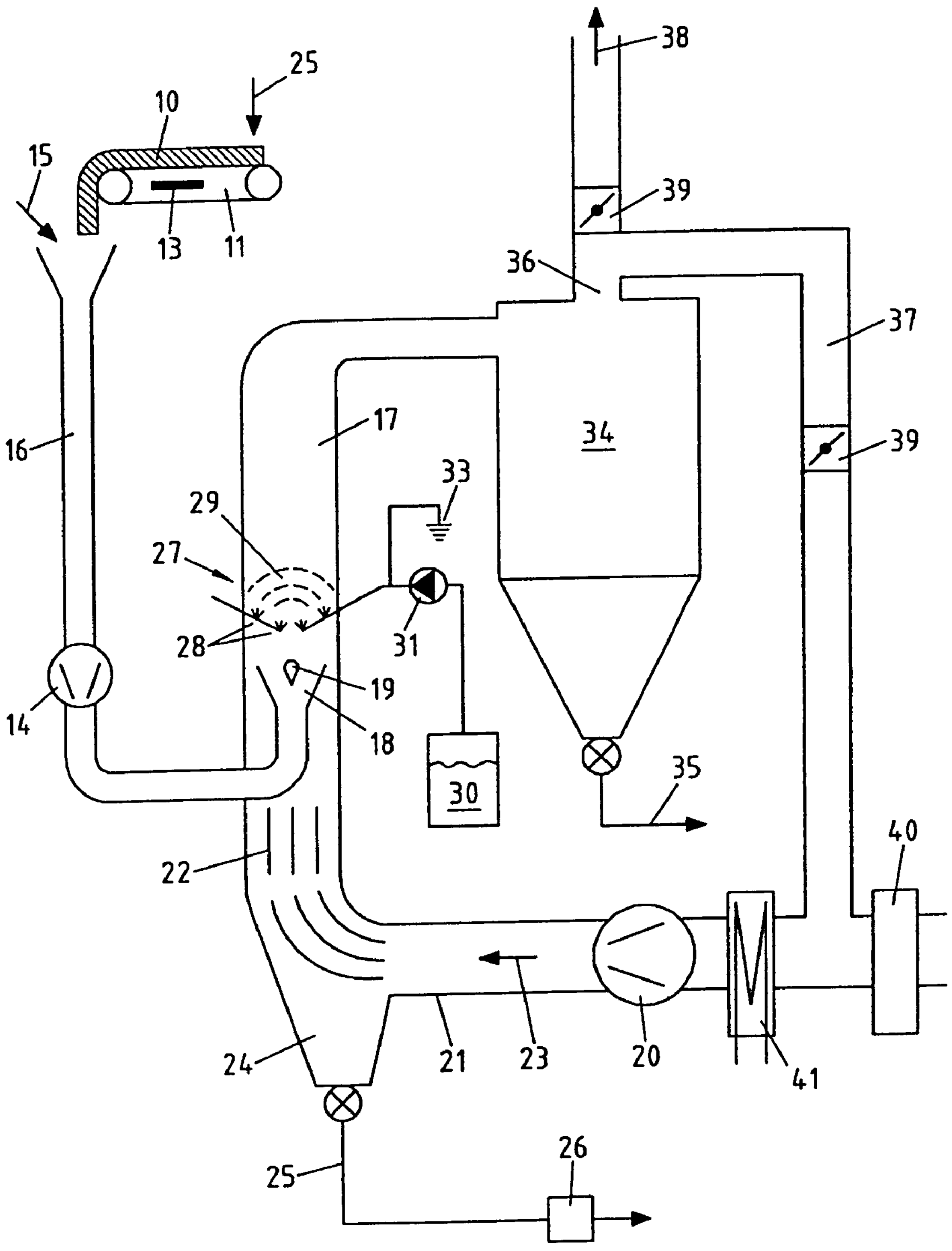
FIG. 2 is a first embodiment of an inventive device for wetting solid particles, in particular wood fibres with a fluid, in particular a binding fluid.

FIG. 2 illustrates an embodiment of a plant for carrying out the inventive process. The material 10 to be wet is sent to a pipe 16 via a transport device 11. The mass flow of the material 10 can be determined by a weighing instrument 13. A fan 14 conveys the material 10, mixed with additional transport air 15, via a transport line 16 to a generally vertical ascending pipe 17. The quantity of transport air 15 should be sufficient to ensure trouble-free transport of the material 10 to the ascending pipe 17. The fan 14 also has the task of loosening possible agglomerates of the material. At the end of the transport line 16 a nozzle 18 can be located for homogeneous distribution of the material 10 across the cross-sectional area of the ascending pipe 17, which can have special flow guide baffles 19 for better fulfilling this task.

The transport speed of the material 10 in the transport line 16 is—to avoid deposits—20 m/sec and more. An air fan 20 sends air 23 in sufficient quantity to the ascending pipe 17 to convey the material 10. Air is not exclusively understood to mean air in the sense of ambient air, rather any kind of gases and mixtures thereof. The air 23 can, if wanted, be warmed with a heat register 41. Likewise it is conceivable to bring the moisture in the air 23 with devices 40 to adjust same in a desired range. These devices 40 can for example comprise water injection or steam injection, so far as the absolute humidity is to be raised. Cooling devices for condensation of water vapour are just as feasible for lowering the absolute humidity. The device 40 can also be arranged after the heat register 41.

The air 23, conveyed to the fan 20, can be ambient air or can originate from another process, such as e.g. from a combustion process, waste air from a gas turbine or waste air from any other production process. A mixture of different waste air flows is also possible. In any case it is a requisite that possibly present gaseous, vaporous or solid contaminants do not interfere with the function and operation of the inventive device. In particular, faults can be caused by solid and vaporous contaminants, which lead to depositing on the inner walls of the entire device and in particular in the air fan 20.

The air 23 coming from the air fan 20 guides an air line 21 to the ascending pipe 17. Baffles 22 should provide or ensure distribution of the air 23 over the cross-sectional area of the ascending pipe 17 to adjust an flow profile favourable for carrying out the process. This can be homogeneous or display sharp differences between the edge and core areas. The flow distribution must not be necessarily homogeneous. It may be necessary to synchronise the distribution with the direction of flow of the devices behind the baffles 22, such as e.g. the nozzle 18 and the baffles 19.

Baffles 22 for deflecting the air flow are also feasible at other points such as e.g. in the ascending pipe 17. But in the event of an arrangement in areas, where fluid and/or material are already present, it must be considered that contamination and/or wear of the baffles 22 is possible, which would impair the functioning of the inventive device.

In the ascending pipe 17 the air 23 mixes with the material 10 and the transport air 15. The speed in the ascending pipe 17 is selected depending on the aerodynamic properties of the material such that on the one hand transport of the material 10 is enabled, and on the other hand agglomerates of the material can decrease. There are devices 24 present for discharging these agglomerates. Depending on their nature the discharged agglomerates 25 can be supplied to the flow of material 10 of the transport device 11, and if required the agglomerates 25 are dispersed in a mineral processing plant 26.

The device 24 is shown here as a downwards directed collecting cone, but any other design is feasible, such as e.g. a conveyor belt in the floor region of the ascending pipe 17 or a screw type extractor.

The mixture of material 10, transport air 15 and conveying air 23 freed of agglomerates flows on in the ascending pipe 17 to the fluid wetting unit 27. The latter comprises a plurality of nozzles 28, which distribute the fluid 30 as a fine fluid mist 29 across the cross-sectional area of the ascending pipe 17. For this a pump 31 conveys the fluid 30 out of a supply tank 32 to the nozzles 28.

High-pressure nozzles according to the airless principle have proven effective as nozzles 28, but also atomisers according to all other principles are possible such as e.g. air atomisers or rotation atomisers. High-pressure nozzles according to the airless principle and rotation atomisers require no additional medium, such as e.g. air, to form the necessary spray mist 29.

The pump 31 guides the fluid 30 to the nozzles 28. The pressure depends on the rheologic properties of the fluid 30 and the requirements for the fluid mist 29 with respect to the diameter of the individual fluid drops.

While the material 10 is conveyed by the fluid mist 29, the fluid drops condense on the material 10 and wet the latter. The wetting can be supported by the presence of an electric potential difference between the fluid drops and the material. Potential differences can be achieved by friction or by applying different voltage potentials. Such a device 33 is schematically illustrated by the lines for the fluid 30 from the pump 31 to the fluid wetting unit 27 lying on the earth potential.

Specific components made of a special material can be produced or can have a special coating for supporting the formation of potential differences. Special materials can be those, which . . . on account of the friction of the . . . [incomplete original sentence]. The fan 14, the transport line 16, the nozzle 18 and the baffles 19, as well as the parts 27, 28, 31 and 32 are particularly suitable for this purpose.

The fluid wetting unit 27 comprises a plurality of nozzles 28, attached to the side averted from the flow.

The material 10 wet with fluid 30 reaches a material separator 34 for separating air flow and is forwarded for further processing or storage 35. The excess air 36 from the material separator 34 is either sent to the atmosphere as waste air 38 (optionally on completion of waste air cleaning) or sent on the process as return air 37.

The ratio of waste air 38 to return air 37 is set by means of both butterfly valves 39.

The cross-sections of the transport line 16 and of the ascending pipe 17 are preferably rotationally symmetrical, but also any other cross-section shape is feasible, such as e.g. square, rectangular, polygonal or elliptical.

Figure 3:
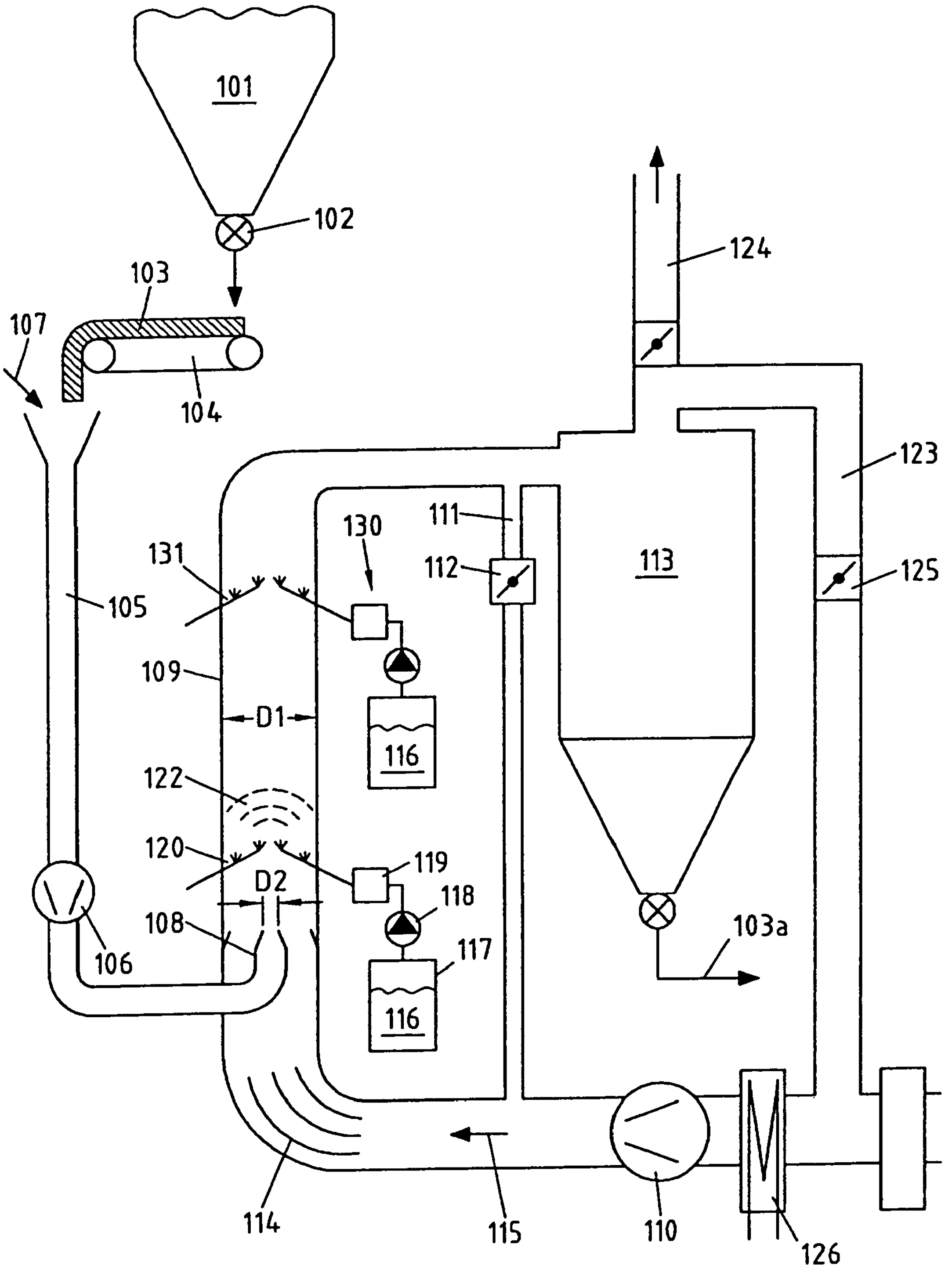
FIG. 3 is a second embodiment of an inventive device for wetting solid particles, in particular wood fibres with a fluid, in particular a binding fluid.

An embodiment for applying binding agents or additives to wood fibres is shown in FIG. 3. Dried wood fibres from the dryer are separated in the cyclone 101 from the dryer air and discharged by the latter by means of a cell wheel sluice 102. The wood fibres 103 usually have moisture in the range between 5 to 15%. A conveyor belt 104 takes over the wood fibres and forwards them to the fibre transport line 105. The fibre fan 106 brings the wood fibres 103 along with the transport air 107 to the nozzle 108, which discharges the fibres parallel to the axis into the ascending pipe 109.

The diameter of the transport line 105 is clearly smaller than that of the ascending pipe 109. A diameter ratio of D1:D2=3:1 to 7:1, in particular 4:1 to 6:1, preferably approximately 5:1 has proven favourable.

An air fan 110 supplies air to the ascending pipe 109. For regulating the quantity of air in the ascending pipe 109 there is the bypass feeder 111, which depending on the position of the butterfly valve 112 guides a partial flow of the air past the ascending pipe 109 and terminates in the ascending pipe before its inlet to the cyclone 113. This ensures on the one hand that the cyclone 113 works at the ideal work point independent of the quantity of air guided via the ascending pipe 109, and that on the other hand the quantity of air required for optimal operation of the device is present in the ascending pipe 109.

Baffles 114 in the intake area of the ascending pipe 109 should distribute the incoming air 115 in known fashion over the cross-section. In the vicinity of the nozzle 108 the transport air 107, the wood fibres 103 and the air 115 are mixed and move up the pipe. A vertical arrangement of the ascending pipe 109 offers certain advantages for this type of material, while a horizontal or oblique arrangement is also conceivable.

A binding agent 116 is conveyed by a pump 118 from the reservoir 117 into a distributor pot 119. This supplies several nozzle lances 120, on which a plurality of airless high-pressure nozzles is arranged. The number of nozzles is approximately 20 to 50 pieces per 1000 kg of wood fibres, which are guided by the plant per hour. The pressure range of the nozzles lies between 10 to 80 bars, preferably between 20 and 40 bar.

FIG. 3 shows the position of the nozzle lances according to nozzle 108, by means of which a contact of the nozzle lances 120 and of the nozzles 121 is possible with the wood fibres. An arrangement at the level of the nozzle 108 or underneath to avoid contact with the wood fibres is just as feasible, however.

Figure 4:
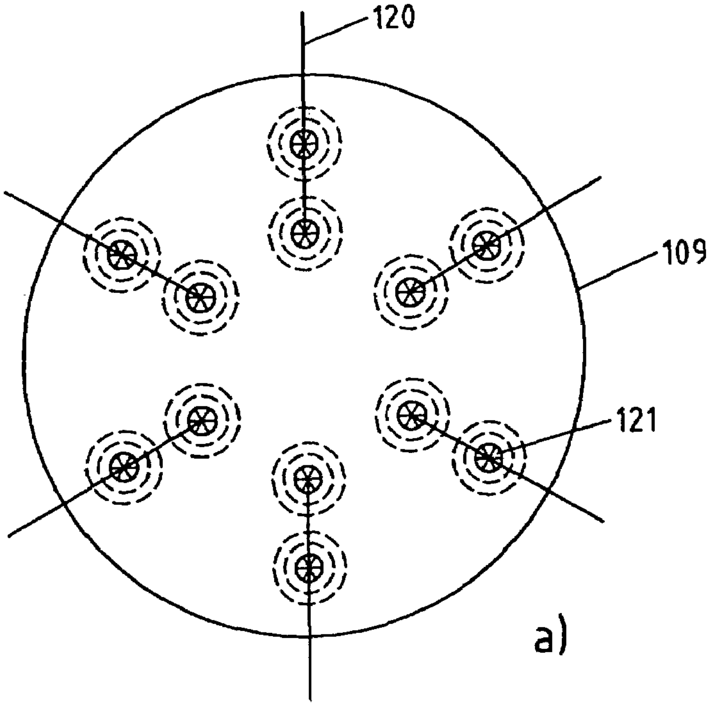
FIG. 4 shows two configurations of means for supplying the fluid, in particular a binding fluid.
Figure 4:
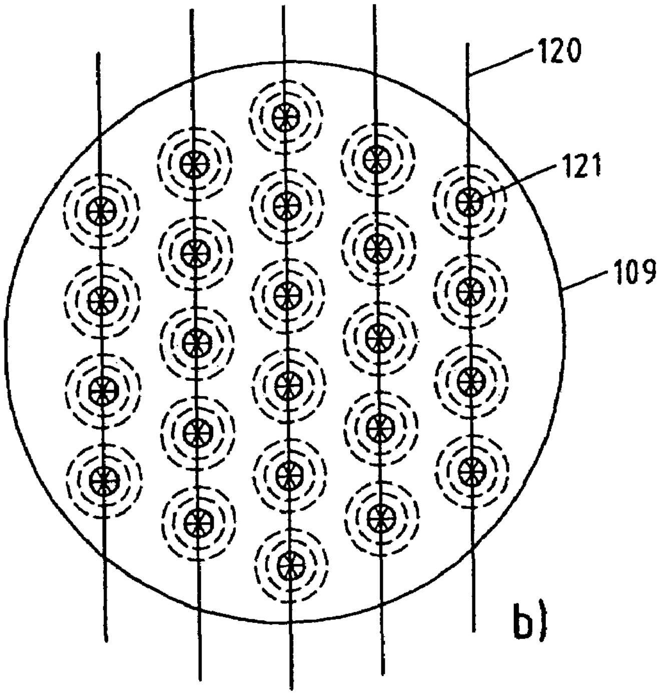

FIG. 4 shows a sectional view of the arrangement of the lances 120 in the ascending pipe 109. So a star-shaped arrangement (FIG. 4*a*) of the lances 120 with the nozzles 121 is just as feasible as a parallel arrangement (FIG. 4*b*).

In FIG. 3 the wood fibres 103 flow in the ascending pipe 109 through the binding agent mist 122, by means of which uniform wetting of the fibres is possible. The cyclone 113 separates the fibres from the air flow. The waste air from the cyclone can be partially supplied back to the fan 110 via the return air line 123 depending on the position of the butterfly valve 125. Excess air is discharged to the atmosphere via the line 124. The heat register 126 enables the air 115 to be heated. The thus glued wood fibres 103*a* are sent on for further production.

In addition to the binding agent additives can also be applied to the wood fibres. A possibility is the supplying as a mixture of binding agent and additives, separate supply with two separate coating systems 120 and 131 and separate nozzle planes is just as possible. FIG. 3 shows this variant with the device 130, whereby the mist zone of the additives can be locally separated from the mist zone 122.

Common application of binding agent and additives in a single nozzle plane is likewise conceivable. For this, specific lances 120 are supplied with binding agent, and other lances of the same nozzle plane are supplied with additives.

The following examples 1 to 3 clarify the advantages of the inventive process.

EXAMPLE 1

In a device for dry adhesion of wood fibres according to FIG. 3 ca. 3000 kg/h wood fibres are adhered. The fibres originate from a conventional MDF production line following the drying process. Adhesion via the blowline is just as possible as adhesion exclusively via the dry adhesion device. The guide tube is designed as a vertical ascending pipe with a diameter ratio of ascending pipe to transport pipe of 3:1.

The air speed in the transport line is approximately 8-12 m/s, while that of the conveying air stream in the ascending pipe is between 20 and 30 m/s.

Conventional MDF boards are manufactured according to conventional blowline adhesion with the following properties:

density 760 kg/m$^3$
adhesive type: conventional UF adhesive
quantity of adhesive: 12% by weight sold resin to wood fibre dry mass
wax emulsion: 0.6% solid wax relative to wood fibre dry mass
board thickness: 15 mm
flexural resistance: 35 N/mm$^2$
flexural elasticity module: 3500 N/mm$^2$
transverse strength: 1,00 N/mm$^2$
24-hour thickness swelling: 9,0%

Adhesion was modified to the extent that 4.5% quantity of adhesive relative to the dry mass was metered via the blowline and 4.5% via the dry adhesion device. The properties of the resulting board were not modified significantly by this. The binding agent, which was applied via the dry adhesion device, was clearly more reactive than that of the blowline adhesion, by means of which the press factor was able to be reduced by approximately 15% from 10 s/mm to 8.5 s/mm.

Adhesion was then changed to the extent that the entire quantity of binding agent of 5.5% relative to the wood dry mass was applied with the dry adhesion device. The press factor could be reduced to 7 s/mm. The properties of the resulting board were not modified by this significantly.

EXAMPLE 2

The same device was used to manufacture HDF boards. A UF resin reinforced with 6% melamine was employed as binding agent.

HDF boards are produced according to conventional blowline adhesion with the following properties:

density 900 kg/m$^3$
adhesive type: MUF adhesive 6%
quantity of adhesive: 15% by weight solid resin to wood fibre dry mass
wax emulsion: 1.8% solid wax relative to wood fibre dry mass
board thickness: 8 mm
flexural resistance: 50 N/mm$^2$
flexural elasticity module: 5000 N/mm$^2$
transverse strength: 1.83 N/mm$^2$
24-hour thickness swelling: 10%

Adhesion was then changed as described in Example 1 to a ratio of blowline adhesion:dry adhesion of 6%:5%. The properties of the resulting HDF board were not modified significantly by this. The press factor could be reduced from 9 s/mm to 7.5 s/mm.

Adhesion was then changed to the extent that the entire quantity of binding agent of 8% relative to the wood dry mass was applied with the dry adhesion device. The press factor was able to be reduced to 6.3 s/mm. The properties of the resulting board were not modified significantly by this.

EXAMPLE 3

In analogy to Examples 1 and 2 LDF boards are produced with an isocyanate as binding agent. In concrete terms this is a fibre board open to diffusion, suited in particular to roof and wall lining. The board properties were as follows:

density 625 kg/m$^3$
board thickness: 15 mm
quantity of adhesive: 5%
wax emulsion: 2.2% by weight solid wax
water vapour diffusion resistance value: ca. 11
heat transfer coefficient k: 6.7 m$^2$K/W
transverse strength: 0.35 N/mm$^2$
flexural resistance: 17.8 N/mm$^2$
flexural elasticity module: 2150 N/mm$^2$
24-hour thickness swelling: 9.0%

Adhesion was varied as in the following table without significant change in the board properties:

| | | |
|---|---|---|
| adhesion blowline: | 2% | 0% |
| dry adhesion: | 2% | 3% |

The invention claimed is:

1. A device for wetting wood fibres with a binding fluid,
with a transport pipe for transporting the wood fibres,
with a fan for generating a transport air current,
with a guide tube connected to the transport pipe,
with a fan for generating a conveying air current in the guide tube,
with means for supplying the binding fluid in the guide tube.

2. The device as claimed in claim 1, wherein the guide tube is designed as an ascending tube.

3. The device as claimed in claim 2, wherein the guide tube is aligned substantially vertically.

4. The device as claimed in claim 1, wherein the opening of the transport pipe aligned in the guide tube is designed as a nozzle.

5. The device as claimed in claim 4, wherein the diameter of the guide tube is at least twice as large as the diameter of the opening of the transport pipe.

6. The device as claimed in claim 5, wherein the ratio of the diameter is between 3:1 and 7:1, in particular between 4:1 and 6:1 and preferably 5:1.

7. The device as claimed claim 1, wherein a heater for heating the conveying air stream in the direction of flow is arranged before the opening of the transport pipe is.

8. The device as claimed in claim 1, wherein a device is provided for adjusting the moisture of the conveying air stream.

9. The device as claimed in claim 1, wherein flow element is provided in the conveying air stream for adjusting the flow rate distribution.

10. The device as claimed in claim 1, wherein the means for supplying the binding fluid has at least a nozzle, preferably a plurality of nozzles.

11. The device as claimed in claim 10, wherein at least one nozzle produces a fluid mist.

12. The device as claimed in claim 10, wherein at least a nozzle lance extending at least partially inside the guide tube is provided with at least a nozzle.

13. The device as claimed in claim 1, wherein a device is provided for generating an electric potential difference between the wood fibres and the fluid drops.

14. The device as claimed in claim 1, wherein a bypass feeder arranged parallel to the guide tube is provided with a butterfly valve for adjusting the quantity of air flowing through the guide tube.

15. The device as claimed in claim 1, wherein at least another means is provided for supplying fluids or additives dispersed in a fluid.

16. The device as claimed in claim 15, wherein the means for supplying the binding fluid and the means for supplying additives are arranged successively in the direction of flow inside the guide tube.

17. The device as claimed in claim 15, wherein the means for supplying the binding fluid and the means for supplying additives are arranged in the direction of flow inside the guide tube in the same nozzle plane.

18. A process for wetting wood fibres with a binding fluid, said process comprising:

supplying the wood fibres to a guide tube with a transport air flow, generating a conveying air stream in the guide tube, conveying the wood fibres fed with the transport air flow to the conveying air stream in the guide tube, supplying the binding fluid from the outside and distributing in the guide tube, and wetting the wood fibres at least partially with the distributed binding fluid.

19. The process as claimed in claim 18, further comprising conveying the wood fibres in the guide tube substantially vertically upwards.

20. The process as claimed in claim 19, further comprising feeding an additive in the form of a fluid or in the form of a solid dispersed in a fluid to the conveying air stream and wetting the wood fibres at least partially with the additive.

21. A process for manufacturing a fibre board, in particular a medium-density fibre board, a high-density fibre board or a fibre board of minimal density comprising at least a portion of wood fibres and a portion of binding agent, said process comprising:

pulping wood in a cooker under the effect of temperature and pressure, mechanically shredding the pulped wood, feeding the resulting mixture of water, water vapour and wood fibres to a dryer by means of a blowline, at least partially shredding and drying the wood fibres in the dryer, at least partially wetting the dried wood fibres by means of the process as claimed in claim 18 with a binding fluid, feeding the wood fibres at least partially wet with binding fluid to a former for manufacturing a form cake, and making a fibre board out of the form cake by means of a press.

* * * * *

UNITED STATES PATENT AND TRADEMARK OFFICE

CERTIFICATE OF CORRECTION

PATENT NO. : 7,588,832 B2
APPLICATION NO. : 10/494535
DATED : September 15, 2009
INVENTOR(S) : Schiegl et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1192 days.

Signed and Sealed this

Fourteenth Day of December, 2010

David J. Kappos
*Director of the United States Patent and Trademark Office*